No. 669,138. Patented Mar. 5, 1901.
H. E. GRABAU.
MACHINE FOR MAKING CIGARETTE RODS AND CIGARETTES.
(Application filed June 21, 1899.)
(No Model.) 10 Sheets—Sheet 1.

No. 669,138. Patented Mar. 5, 1901.
H. E. GRABAU.
MACHINE FOR MAKING CIGARETTE RODS AND CIGARETTES.
(Application filed June 21, 1899.)
(No Model.) 10 Sheets—Sheet 5.

No. 669,138. Patented Mar. 5, 1901.
H. E. GRABAU.
MACHINE FOR MAKING CIGARETTE RODS AND CIGARETTES.
(Application filed June 21, 1899.)
(No Model.) 10 Sheets—Sheet 6.

Witnesses

Inventor
Hans Edgar Grabau
Attorneys

No. 669,138. Patented Mar. 5, 1901.
H. E. GRABAU.
MACHINE FOR MAKING CIGARETTE RODS AND CIGARETTES.
(Application filed June 21, 1899.)
(No Model.) 10 Sheets—Sheet 7.

No. 669,138. Patented Mar. 5, 1901.
H. E. GRABAU.
MACHINE FOR MAKING CIGARETTE RODS AND CIGARETTES.
(Application filed June 21, 1899.)
(No Model.) 10 Sheets—Sheet 8.

Witnesses
Inventor
Hans Edgar Grabau
Attorneys

No. 669,138. Patented Mar. 5, 1901.
H. E. GRABAU.
MACHINE FOR MAKING CIGARETTE RODS AND CIGARETTES.
(Application filed June 21, 1899.)
(No Model.) 10 Sheets—Sheet 10.

UNITED STATES PATENT OFFICE.

HANS EDGAR GRABAU, OF HOBOKEN, NEW JERSEY, ASSIGNOR TO THE GARCIA-RABELL TRADING COMPANY, OF NEW YORK, N. Y.

MACHINE FOR MAKING CIGARETTE-RODS AND CIGARETTES.

SPECIFICATION forming part of Letters Patent No. 669,138, dated March 5, 1901.

Application filed June 21, 1899. Serial No. 721,352. (No model.)

*To all whom it may concern:*

Be it known that I, HANS EDGAR GRABAU, a subject of the Emperor of Germany, residing at Hoboken, in the county of Hudson and State of New Jersey, have invented certain new and useful Improvements in Machines for Making Cigarette-Rods and Cigarettes, of which the following is a specification.

This invention relates to certain new and useful improvements in cigarette-machines, having for its object to provide a machine capable of manufacturing cigarettes economically in a perfect manner and at an exceedingly high rate of speed.

With this object in view the invention consists in the novel construction, combination, and arrangement of parts hereinafter set forth with more particularity.

In the accompanying drawings, forming a part of this specification, and in which like characters of reference designate corresponding parts.

The frame $a$ $a$ is suitably constructed to support the feeding devices $b$, the compressing devices $c$, the crimping or pasting apparatus $d$, and the cutter $e$. Beneath the feeder extends a trough $f$, which receives the tobacco from the feeder and through which extends the wrapper-strip $x$, the latter passing through the compressor $c$ and into a folding-trough $j$, above which are arranged folder devices $m$ of any suitable character, by means of which the edges of the wrapper-strip are turned down, and after being pasted or crimped the cigarette-rod then passes through the cutting apparatus $e$.

The compressor $c$ consists of two lower wheels 17 18, around which passes a conveyer-belt $g$, the face of which is level with the bottoms of the troughs $f$ $j$, and of an upper belt $h$, which passes around rollers 15 and 16 and which travels with the lower belt and the wrapper-strip to conduct the tobacco positively between the edges of two compression-plates $i$ $i$, which converge at the ends nearest the trough $j$, so as to gradually compress the tobacco laterally to form the filler, which passes from above the lower conveyer-belt $g$ into the trough $j$, where the sides of the paper are turned upward to a standing position. In passing into the trough $j$ the tobacco rod meets an incline plate $n$, which folds down the loose fibers, so as to prevent them from being folded into the seam of the wrapper, the plate $n$ also tending to prevent any undue expansion of the filler.

In order to facilitate the forward movement of the wrapper, an endless tape $p$ passes around the belt $g$ on the wheel 17 and over the belt and through the trough $j$ to a drive-wheel 30, around which it passes back to the wheel 17.

Figure 5:
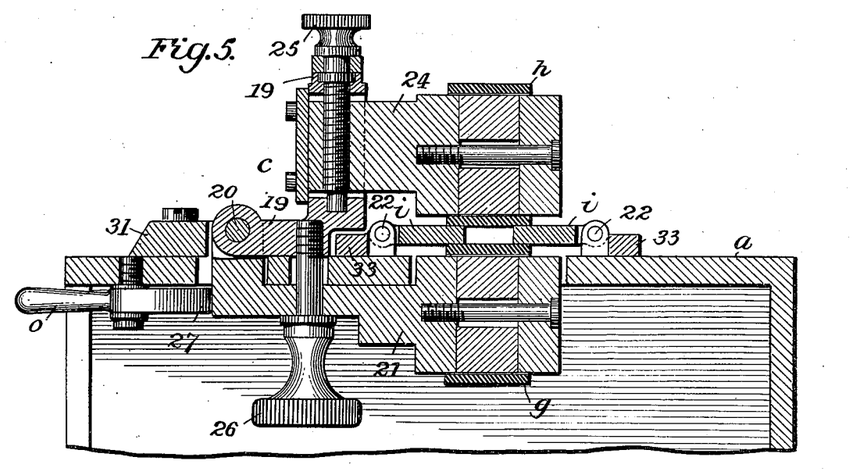
Fig. 5 is a sectional view of the feeding and compressing devices, taken on the line 5 5 of Fig. 2.
Figure 6:
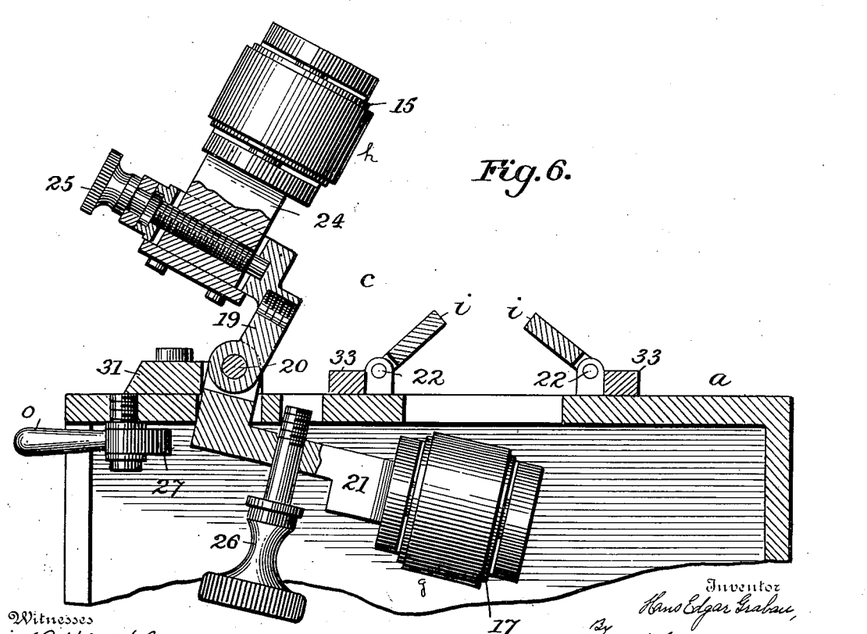
Fig. 6 is a similar view with the parts in a different position.

It is very desirable to be able to obtain access to the tobacco at all points between the feeder and the point where the filler is wrapped, and I therefore provide means whereby the parts which make contact with the tobacco may be readily swung out of and into position. Thus the upper wheels 15 16, carrying the upper belt $h$, are mounted upon a frame 24, carried by a bracket 19, which is hinged at 20 to an adjustable block 31, bolted to the top of the frame $a$. A bracket 21, supporting the lower wheels 17 18, is also hinged at 20 to the plate 31, and thus the parts carrying both the upper and lower belts may be swung away, or either may be swung away from normal position, as desired. A screw-bolt 26, passing through the bracket 21 and through the top of the table and into the bracket 19, serves as a means of holding the parts in place, as indicated in Fig. 5. As it is seldom necessary to remove the lower belt, while the upper one must be frequently swung to one side, the lower bracket 21 is supported in position by means of a pivoted cam 27, provided with a handle o By loosening the bolt 26, therefore, the upper belt may be swung to one side while the lower one is held in place; but by swinging the cam 27 the lower bracket may be dropped. Inasmuch as the plate 31 is vertically adjustable, the belts may be shifted laterally to any desired position, and the frame 24 is adjustable upon the bracket 19 by means of a screw 25 to regulate the pressure of the upper belt upon the plates $i\ i$. These plates $i\ i$ are connected by horizontal pivots 22 22 to plates 33 33, bolted adjustably to the top of the frame $a$. The shafts of the wheels carrying the belts $g\ h$ are carried by blocks 35 36, connected by a screw-pin 37, which may be turned by means of a head $37^a$, so constructed that it may be grasped between the fingers or be operated by a suitable tool, to thus separate the blocks to tighten the belts. Before reaching the paster one edge of the wrapper is turned in, while the other standing edge is presented to the paster-wheel $37^b$. This wheel $37^b$ has a beveled edge corresponding to the beveled end of the paste-tube 38, which is set at such a distance from the face of the wheel as to permit only a thin film of paste to flow to the edge of the wheel. To effect this adjustment, the wheel turns in a bearing 41, having a threaded extension 42, onto which screws a collar 43 at the lower end of the paste-tube, so that by turning the collar 43 the tube may be raised or lowered to secure the nice adjustment required.

To feed the paste down toward the wheel, the propeller 40 is arranged within the tube 38, being mounted on the shaft 44 of the paste-wheel, which shaft extends downward through a bearing carried by the frame. By the means described a film of any desired thickness may be deposited on the paste-wheel and conveyed to the standing edge of the paper. To prevent any undue accumulation of paste, however, I provide a revolving blade $r$ on a shaft $s$, so arranged that as the blade rotates its edge will pass close to but not in contact with the paste-wheel and will remove therefrom any surplus material, a brush $t$ serving to remove the paste from the blade $r$. After the wrapper passes from the paste-wheel the standing edge is turned down onto the edge below, and the tube is thus sealed, thus forming the cigarette-rod.

To avoid the difficulty incident to the use of a vibrating cutter, means are provided for cutting the rod into short sections or cigarettes by bringing it against the edge of a rotary cutter-wheel, which may be effected, without injury to the rod, by moving the parts more rapidly than where a vibrating cutter is employed, and without any detrimental jarring of the machine.

The cutting devices are best shown in Figs. 8 to 11, where 50 represents a funnel of rigid material, to which is connected a flexible funnel 51 of wound wire gradually contracting and extending to a conductor-tube 52 into an annular recess, in which extends the forked end of a lever 53, the lower end of which projects into an inclined slot $x$ in a bracket 54. The lever 53 is pivoted to and carried by a T-lever $u$, pivoted at $v$ to a bracket 55, and the opposite end of the lever $u$ is forked and enters an annular groove in a pulley 56, secured to the shaft 57 of the cutter-wheel $v'$, which shaft turns and slides in bearings $w$. The T-lever $u$ carries an antifriction-wheel $56^a$, which bears against a cam $57^a$ upon the end of the driving-shaft 58, and a toe $y$ of the cam $57^a$ comes at intervals against the wheel $56^a$ and swings outward the lever $u$, which carries with it the conductor-tube 52 and the cutter-wheel $v'$. As the conductor is carried outward in the direction of the arrow, Fig. 9, the lower end of the lever 53, sliding in the inclined slot $x$, will be swung outward and the upper end will be swung inward, carrying with it the conductor-tube 52 and bringing the cigarette-rod against the edge of the cutter-wheel, which, instantly shearing against the edge of the tube 52, cuts the rod. As both the conductor-tube and the cutter-wheel are carried in the direction of the arrow as the lever $u$ swings outward the cutter and tube maintain their relative positions and the cutter travels with the traveling rod, so that there is a straight shear across the tobacco rod, and as both parts move back to their normal position the tube 52 is carried away from the cutter, permitting the tobacco rod to travel continuously without interruption. By this means the cigarette-rod may be sheared when traveling at any desired rate of speed.

Figure 1:
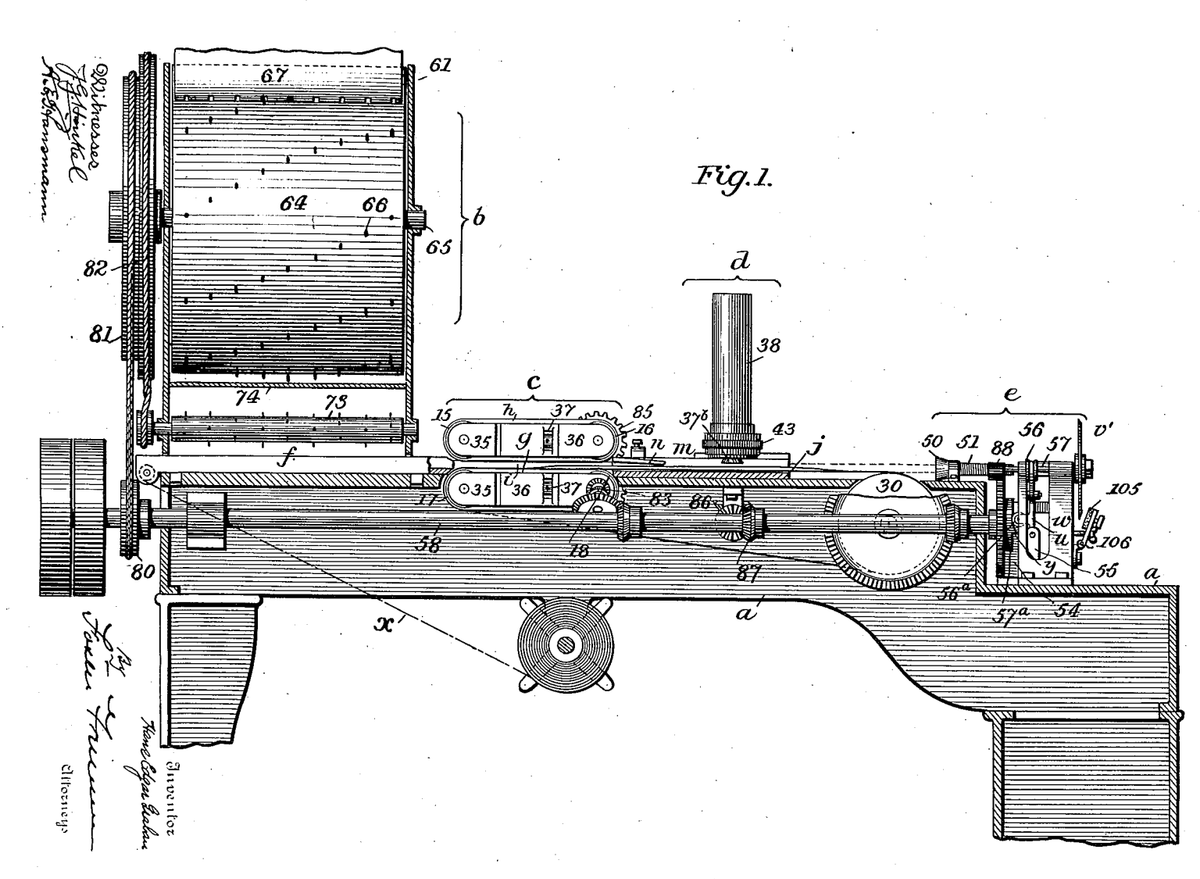
Figure 1 is a side elevation of a machine embodying the invention, parts being in section.
Figure 2:
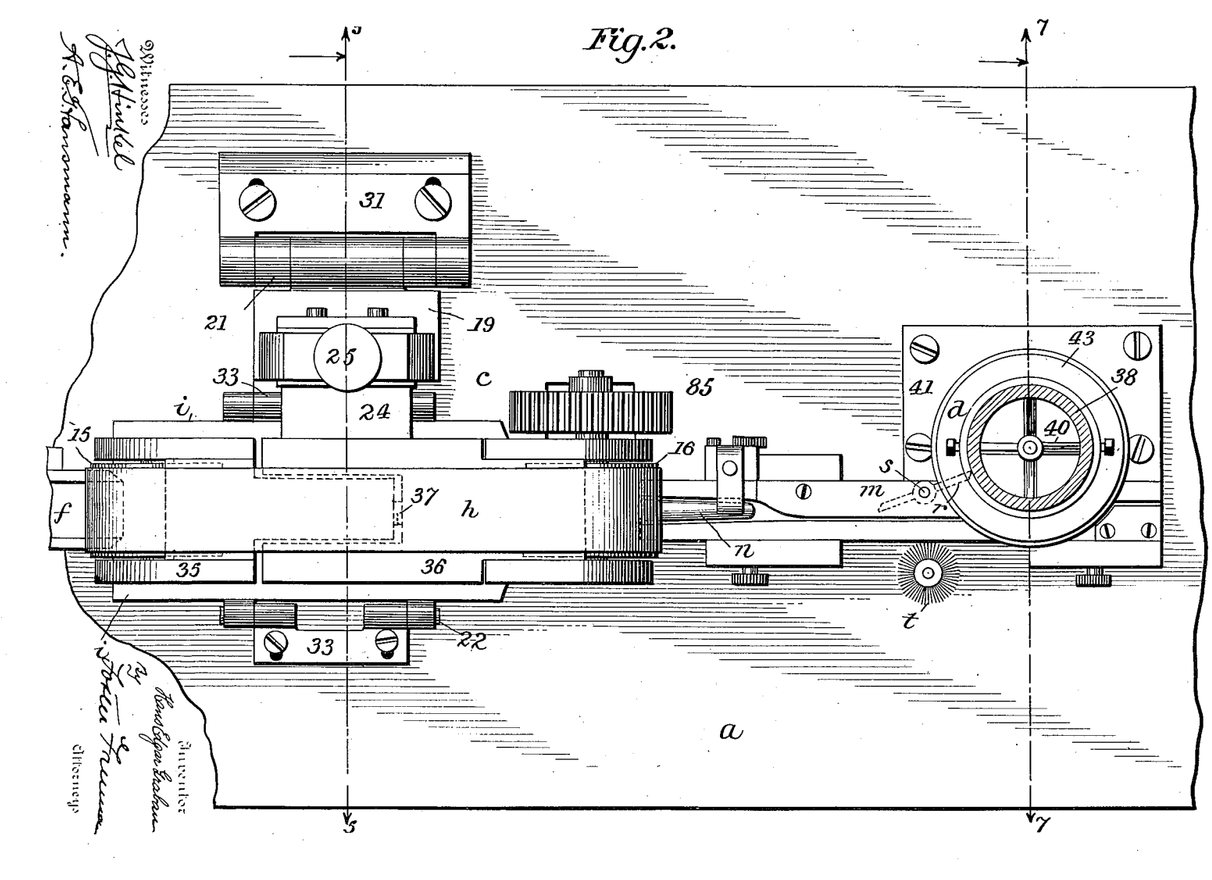
Fig. 2 is an enlarged detail plan view of the feeding, folding, and pasting mechanisms, parts being broken away.
Figure 3:
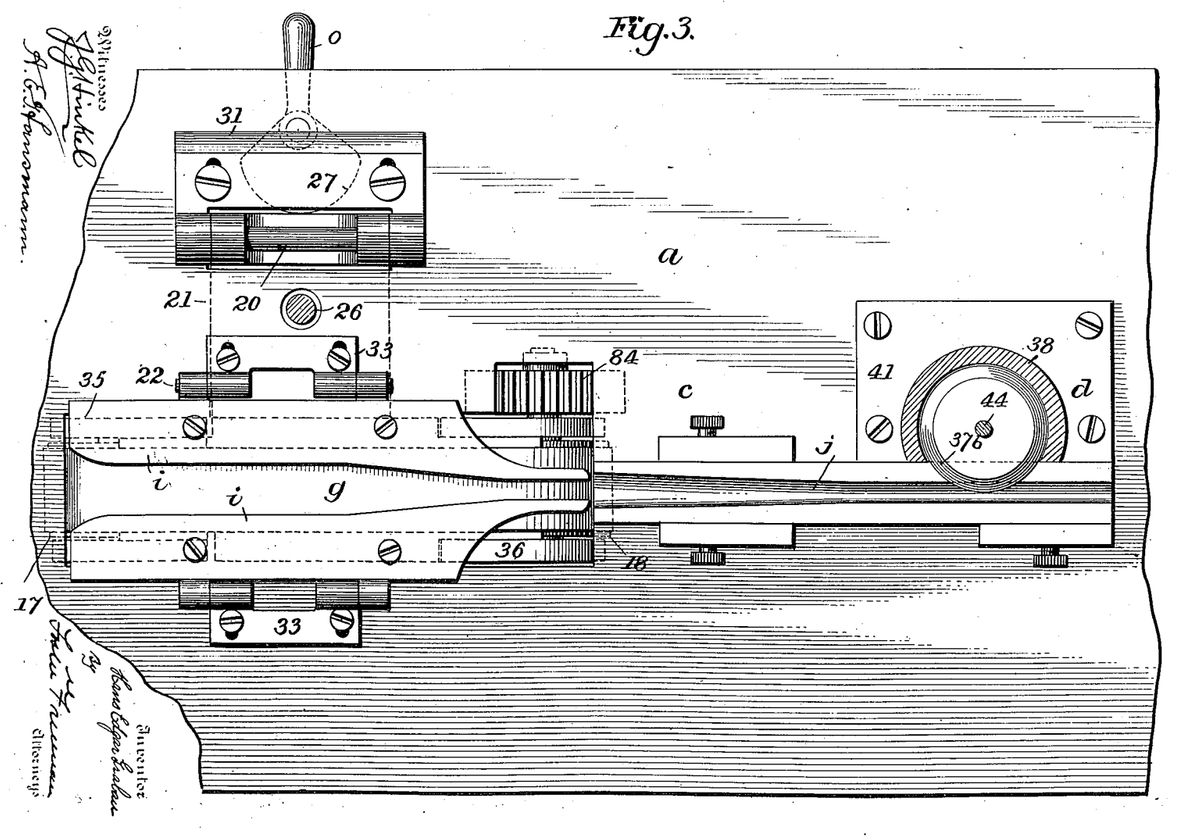
Fig. 3 is a similar view with parts removed.
Figure 12:
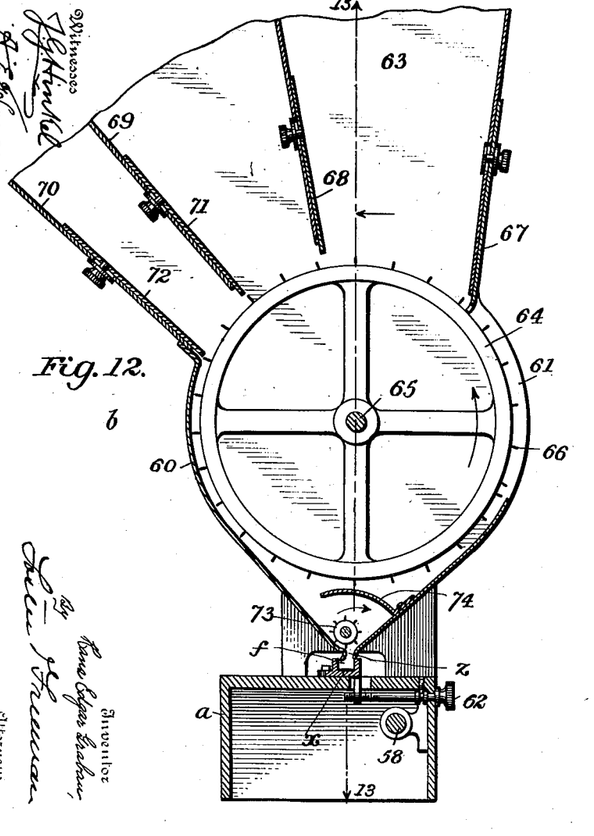
Fig. 12 is an enlarged sectional view of the feed-hopper and its inclosed mechanism.
Figure 13:
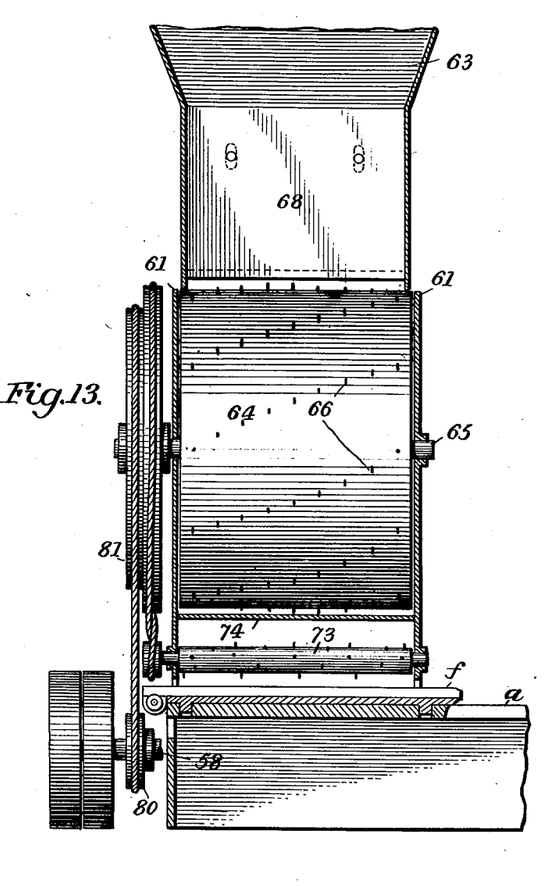
Fig. 13 is a similar view taken on the line 13 13 of Fig. 12, and Figs. 14 to 19 are detail sectional views of wrapper folding and crimping mechanism.

While any suitable feed devices may be employed, there is illustrated in Figs. 1, 12, and 13 a feed apparatus that has proved to be extremely effective. This apparatus is provided with a cylindrical casing 60, with flat ends 61, the sides converging at the bottom toward an outlet $z$, which is above the trough $f$, which latter is secured to the table, so as to be laterally adjustable, by a screw 62, as shown in Fig. 12. The casing 60 is open at the top, above which is a hopper 63, into which the tobacco is put, so as to rest upon the face of the cylindrical drum 64, which rotates with a shaft 65, passing through the ends of the casing. The drum 64 is somewhat smaller than the interior of the casing and is provided with radial pins 66 which are arranged in rows inclined as shown in Fig. 13, the pin at one side at the end of one row being in line with the pin at the opposite side at the commencement of the next row. On the outer face of the hopper 63 is an adjustable plate 67, slotted at the lower end for the passage of the pins on the drum, and on the opposite side 70 of the hopper is an adjustable plate 72, and upon intermediate cross-plates 69 69 are adjustably secured the plates 68 and 71. The plate 68 is set with its edge at some distance above the ends of the pins 66. The plate 71 is set with its lower edge closer to the ends of the pins, while the plate 72 is set with its edge so as to barely escape contact with the pins. As a result of this arrangement the pins 66 carry from the mass of tabacco in the hopper a certain portion of the latter, nearly all the surplus above the points of the pins being scraped off by the plate 68, and as the pins pass below the plate 71 any projecting portion of the tobacco above the pins will be removed, as will also any portion which may swell out from above the tops of the pins in passing below the plate 72, so that by the time the pins have passed beneath the plate 72 the tobacco will be evenly and regularly disposed over the surface of the drum and will be carried downward and fall onto the inclined side of the casing, down which it will slide to the outlet $z$ and will pass thence onto the wrapper-strip traveling through the trough $f$. If desired to secure a still more regular and even distribution of the tobacco, a rotating roller 73 may be arranged between the converging sides of the casing and below a guard 74, so as to pick up the tobacco as it slides toward the roller and throw it in the direction of the arrow, Fig. 12, to the opposite side of the casing, down which it will slide toward the opening $z$.

Figure 4:
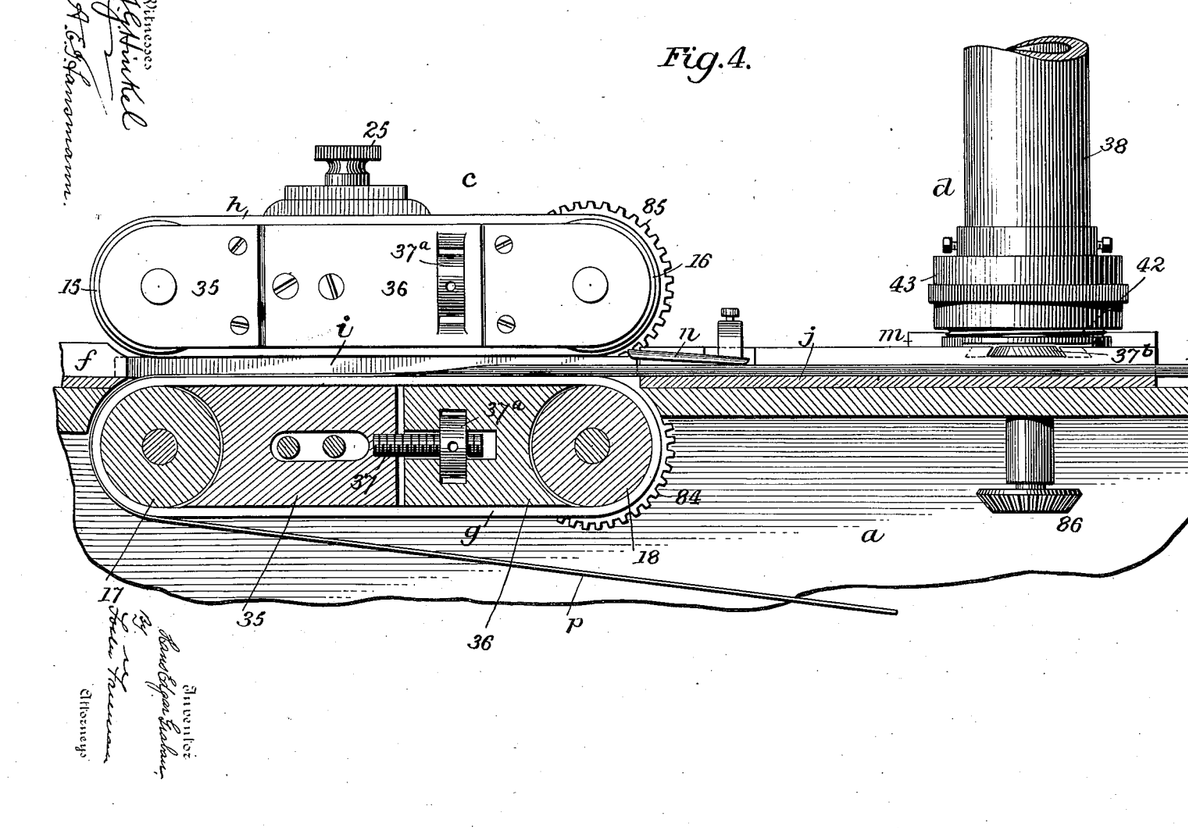
Fig. 4 is an enlarged longitudinal sectional view of the feeding, folding, and pasting devices.
Figure 7:
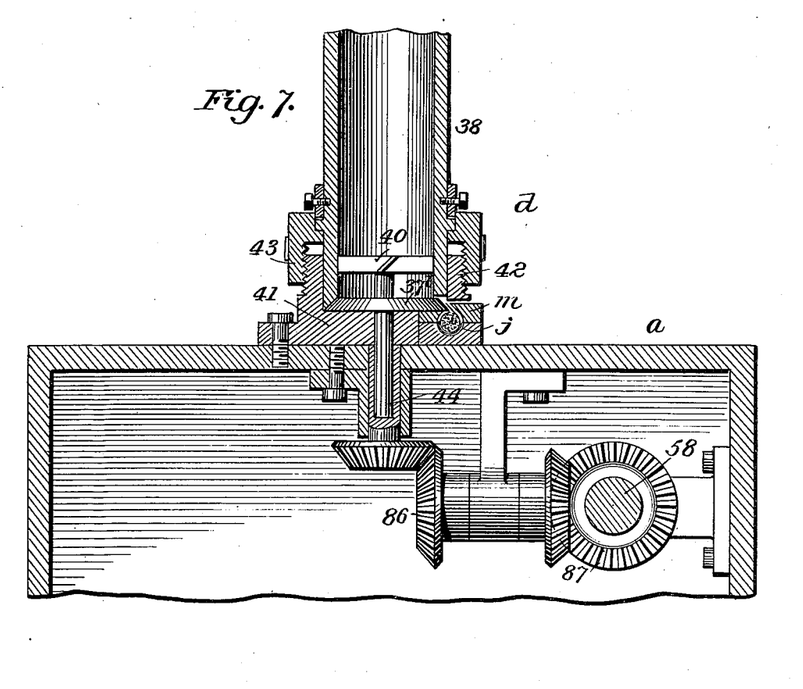
Fig. 7 is an enlarged detail sectional view of the pasting mechanism, taken on the line 7 7 of Fig. 2.
Figure 8:
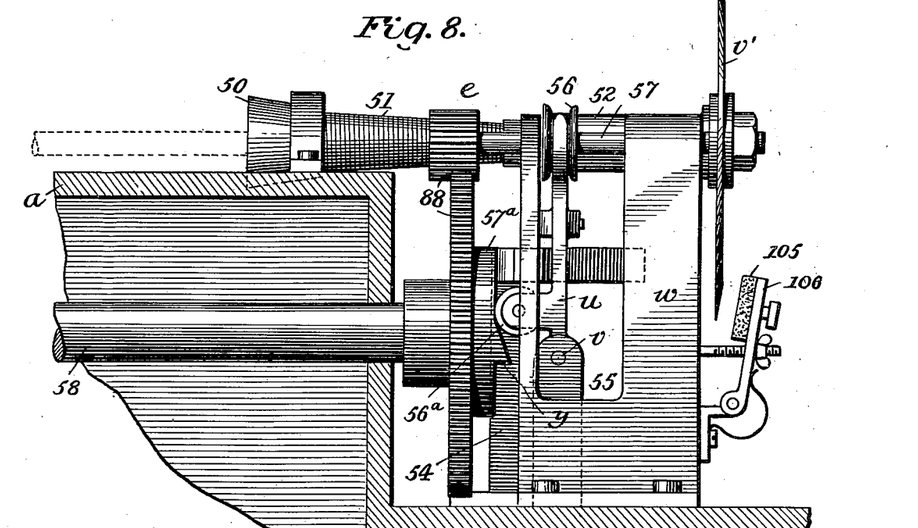
Fig. 8 is an enlarged detail view of the cutting mechanism, parts being in section.
Figure 9:
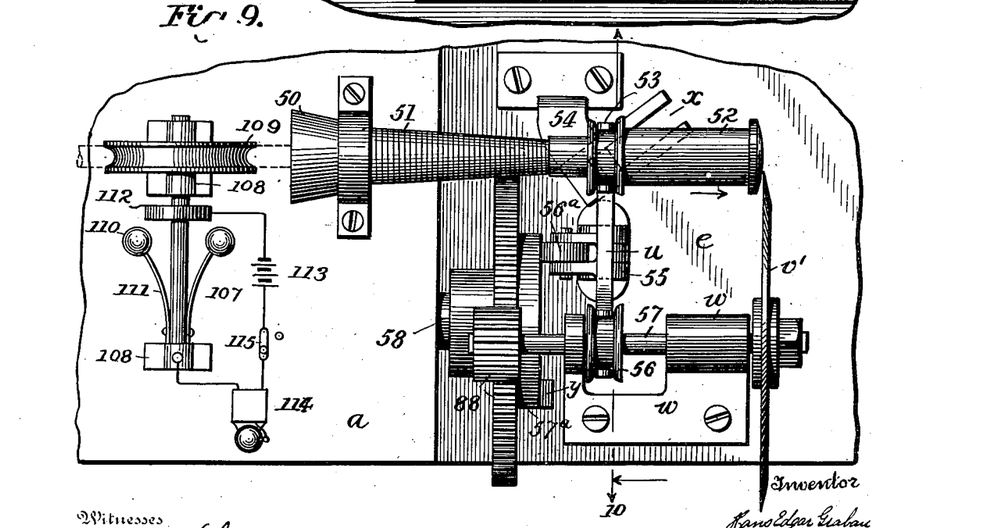
Fig. 9 is a plan view of the same mechanism.
Figure 10:
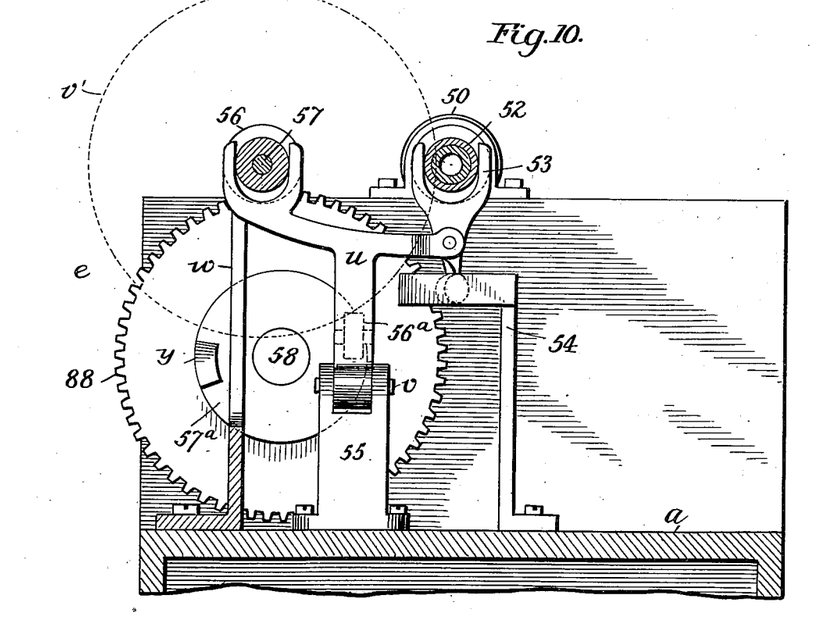
Fig. 10 is a cross-sectional view thereof on the line 10 10 of Fig. 9.
Figure 11:
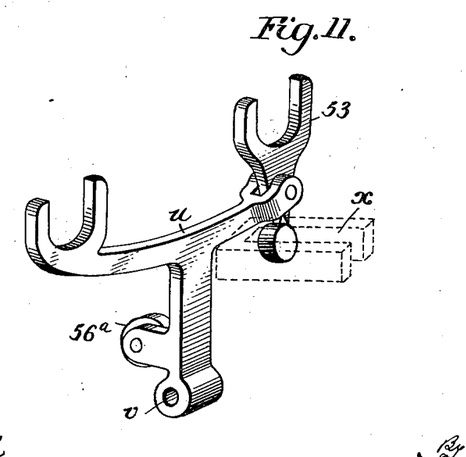
Fig. 11 is a detail perspective view of a part of the cutting mechanism.

The above-described parts may be driven in any suitable manner. As shown, the shaft 58 extends longitudinally beneath the top of the table and is provided with a pulley 80, from which a belt passes to a pulley 81 on the shaft 65 of the feed device, which shaft 65 carries a pulley 82, from which a band passes to a pulley on the end of the shaft of the roller 73. The wheels supporting the lower belt $g$ of the compressor $c$ are driven through the medium of gears 83, while gears 84 85 communicate motion from the wheels of the lower belt to those of the upper belt $h$, as shown in Fig. 4. The paster-wheel 37 is driven from the shaft 58 through the medium of gears 86 87, as shown in Fig. 7, and the shaft 57 of the cutter $v'$ is driven from the shaft 58, through the medium of gears 88, Figs. 8 and 9.

Figure 14:
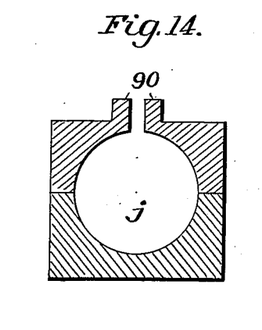
Figure 15:
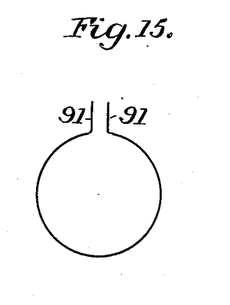
Figure 16:
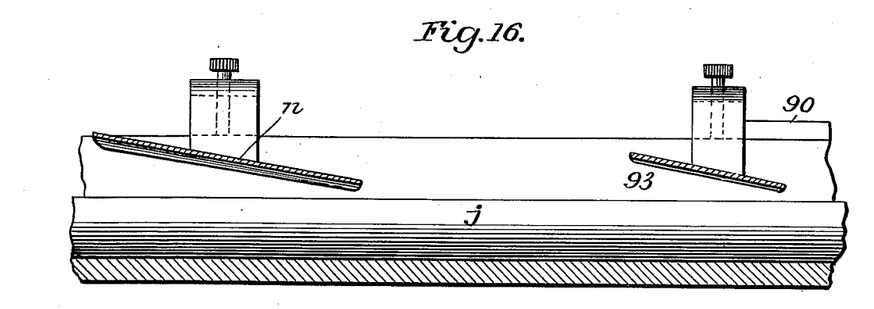
Figure 17:
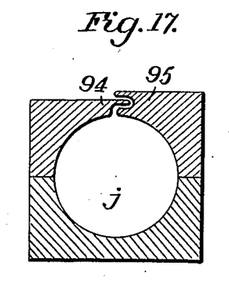
Figure 18:
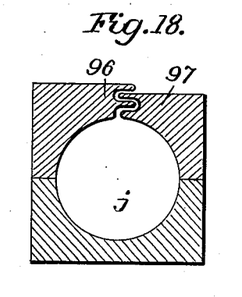
Figure 19:
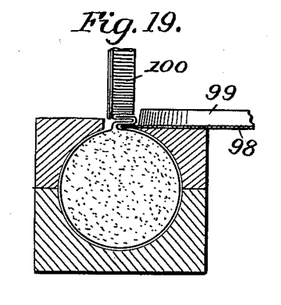

When a crimper is to be substituted for the pasting device, the following-described arrangement is used: The trough $j$, Fig. 14, has an overhanging portion 90, which bends up the edges of the wrapper-strip to form two long flanges 91, Fig. 15. Prior to such bending, however, the tobacco is again compressed by a blade 93, arranged beyond the blade $n$, as shown in Fig. 16. Side blades 94 95 then bend the flanges 91 with a bend first to the right and then to the left, as shown in Fig. 17, and continuations 96 97 bend the flanges again to the right, as shown in Fig. 18, after which the bent or folded portions are brought over the flange 98 of a crimping-wheel 99, against which said portions are compressed by another crimping-wheel 100, as shown in Fig. 19, the material being thus formed into a compressed rib, which is so crimped as to hold the laminæ together, forming a tight seam which cannot be opened without rupturing the paper. It will be seen that the crimping mechanism may be substituted for the pasting mechanism by removing the paster and the folding devices $m$ $n$ and replacing them by the devices 90, 93, 94, 95, 96, 97, 99, and 100

In the manufacture of cigarettes heretofore time has been lost and the effective speed of the machine reduced from the necessity of frequently resharpening the cutter. To avoid this, I combine with the cutter-blade $v'$ a hone or sharpening-stone 105, adjustably supported by a bracket 106, so that it may be brought against the cutter during its operations at intervals or, if desired, maintained in continuous contact therewith, so as to always preserve it in effective condition.

Much loss of time and efficiency in the operation of machines is apt to result from the occasional gumming up of the material in the conducting-trough, so that the tobacco and wrapper become wedged in place, necessitating the stopping of the machine and the opening and unobstructing of the channels. To avoid this, there is combined with the machine a stop device, preferably electrical, which either sounds an alarm or stops the machine as soon as the cigarette-rod fails to feed properly. One form in which such device is made, Fig. 9, consists of a governor 107, the shaft of which turns in bearings 108, carrying a grooved wheel 109, with a rubber periphery bearing upon the cigarette-rod. When the cigarette-rod travels at a normal speed, the balls 110 of the governor, which are upon spring-arms 111, fly out; but when the speed of the cigarette-rod is reduced the balls will approach the spindle of the governor and make contact with a ring 112, which is in the circuit, including a battery 113 and an alarm 114, which therefore begins to sound. A suitable switch 115 may be used to break the circuit when the machine is at rest. Instead of the alarm any of the well-known stop mechanisms adapted to shift the driving-belt or otherwise stop the machine may be employed.

Without limiting myself to the precise construction and arrangement of parts shown, I claim—

1. A cigarette-machine provided with upper and lower traveling belts, of compression-plates arranged between said belts and converging toward one end, and a traveling tape passing over the lower belt, substantially as set forth.

2. The combination of the upper and lower traveling belts, converging compression-plates arranged between the belts, a folding-trough, and a traveling tape passing over the lower belt and through the folding-trough, substantially as set forth.

3. The combination in a cigarette-machine, of a compression device having upper and lower belts, folding or wrapping devices, a conducting-tape passing between the belts of the compression device and through the folding devices, a feed-trough, and means for conducting the wrapper-strip through the feed-trough to the compressing device, substantially as set forth.

4. The combination of the upper and lower traveling belts, and intermediate compression-plates connected by horizontal pivots to be swung laterally into and out of position, substantially as set forth.

5. The combination of the upper and lower belts, intermediate compression-plates, plates 33 to which the compression-plates are connected by horizontal pivots to swing laterally into and out of operative position, and means for securing the plates 33 adjustably upon the frame of the machine, substantially as set forth.

6. The combination of the lower belt and its supporting-wheels, and a frame supporting said wheels and pivotally connected to the frame of the machine to swing into and out of operative position, substantially as set forth.

7. The combination of the lower belt and its supporting-wheels, a pivoted frame 21 supporting said wheels and adapted to be swung into and out of operative position, and a retaining-cam, substantially as set forth.

8. The combination with the upper belt and its supporting-wheels, of a frame 24 in which said wheels are mounted, a bracket carrying said frame, and means for adjusting the frame vertically on the bracket, substantially as set forth.

9. The combination of the main frame, a bracket secured thereto, a frame 24 carried by the bracket and supporting the upper compressing-belt, and a screw 25 for adjusting the frame 24 vertically on the bracket, substantially as set forth.

10. The combination with the lower traveling belt, of an upper belt passing around wheels, and a support for said wheels pivoted to the frame of the machine to swing laterally, substantially as set forth.

11. The combination with the main frame, and a plate 31 adjustably secured thereon, of frames pivotally connected to said plate, and supporting-wheels and upper and lower belts carried by the pivoted frames, substantially as described.

12. The combination of the upper belt and the pivoted frame supporting the same, the lower belt, and the horizontally-pivoted compression-plates, substantially as described.

13. The combination with the folding-trough of a cigarette-machine, of a pasting-wheel 37 having a beveled edge, and a paste-tube beveled at the lower end to correspond to the edge of the wheel, and means for varying the space between the beveled faces, substantially as set forth.

14. The combination of the paster-wheel having a beveled edge supported in a bearing having an annular projection 42, and a paste-tube having a beveled end and supported by a nut 43 engaging said projection, substantially as set forth.

15. The combination of the paste-tube, the paster-wheel, the rotating paste-remover $r$, and the brush $t$, for removing the paste from the remover $r$, substantially as described.

16. The combination of the paste-tube, the paster-wheel, and the rotating paste-remover $r$, substantially as set forth.

17. The combination of a rotating and sliding shaft, and a disk cutter supported thereby, a guide for the cigarette-rod, a vibrating lever $u$ engaging the shaft, a connection between the lever and the guide, means for vibrating said lever, and means for carrying the guide to and from the shaft, substantially as set forth.

18. The combination of the cutter-shaft, the lever $u$ connected to impart longitudinal movement thereto, means for swinging outward the lever $u$, the guide for the cigarette-rod, the forked lever 53 pivoted to the lever $u$ and engaging the guide, and the bracket having an inclined slot $x$ into which the lever 53 extends, substantially as set forth.

19. The combination in a cigarette-machine, of a centrifugal governor and means for driving the same from the moving cigarette-rod, an alarm, and means for operating the alarm from the governor, substantially as set forth.

20. The combination of the casing having a discharge-opening $z$, a drum rotating in said casing and provided with projecting teeth, a hopper above the drum, and a plurality of plates adjustable to bring their lower edges at different distances from the pins of the drum, substantially as set forth.

21. The combination of the casing, the drum provided with pins, the roller 73 below the drum, and the guard 74 above the roller, substantially as set forth.

In testimony whereof I have signed my name to this specification in the presence of two subscribing witnesses.

HANS EDGAR GRABAU.

Witnesses:
 JNO. P. QUILTY,
 F. L. FREEMAN.